United States Patent [19]

Streger

[11] Patent Number: 5,058,273
[45] Date of Patent: Oct. 22, 1991

[54] VIBRATORY CARVING TOOL KIT

[76] Inventor: Howell B. Streger, 790 White Birch Rd., Westwood, N.J. 07675

[21] Appl. No.: 693,152

[22] Filed: Apr. 29, 1991

[51] Int. Cl.⁵ .............................................. B26B 3/00
[52] U.S. Cl. .................................. 30/164.9; 30/277.4; 30/329
[58] Field of Search ...................... 30/45, 164.9, 277.4, 30/329, 337, 393, 394, 169; 15/236.1

[56] References Cited

U.S. PATENT DOCUMENTS

| | | | |
|---|---|---|---|
| 3,388,470 | 6/1968 | Ufer | 30/277.4 |
| 4,083,102 | 4/1978 | Harshberger | 30/45 |
| 4,344,230 | 8/1982 | Olander | 30/164.9 X |
| 4,381,604 | 5/1983 | Horst | 30/45 X |

Primary Examiner—Douglas D. Watts
Attorney, Agent, or Firm—Leon Gilden

[57] ABSTRACT

A carving tool member utilizes a vibratory motor to effect vibratory energy to a shaft projection directed longitudinally of a housing, with the shaft projection mounted to a clamp cylinder. The clamp cylinder selectively mounts a neck member therewithin. The clamp cylinder utilizes various clamp screws directed into the clamp cylinder to secure the clamp cylinder to the wedge projection and the knife member.

3 Claims, 4 Drawing Sheets

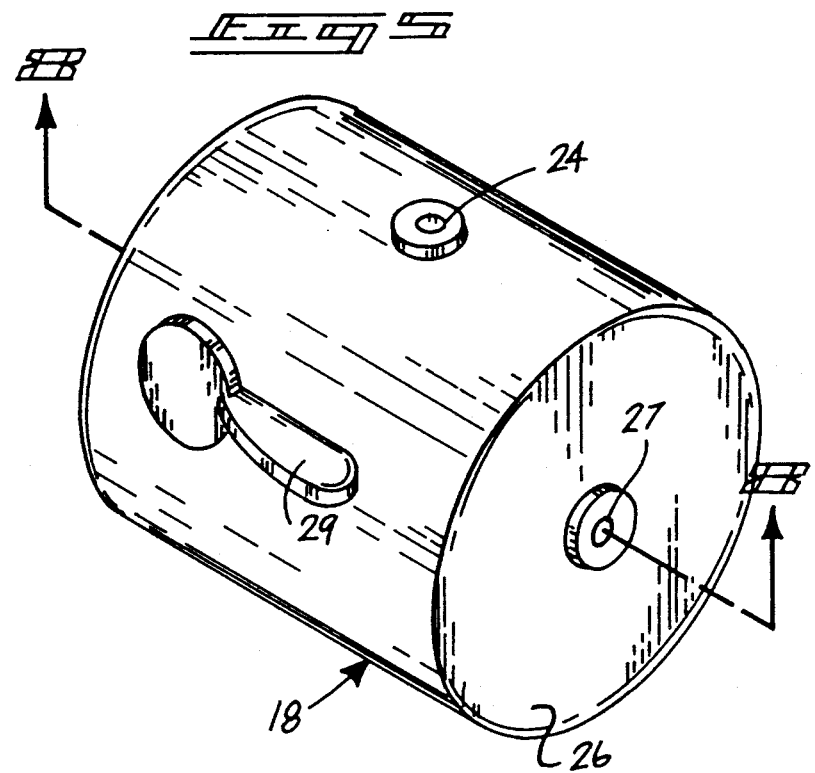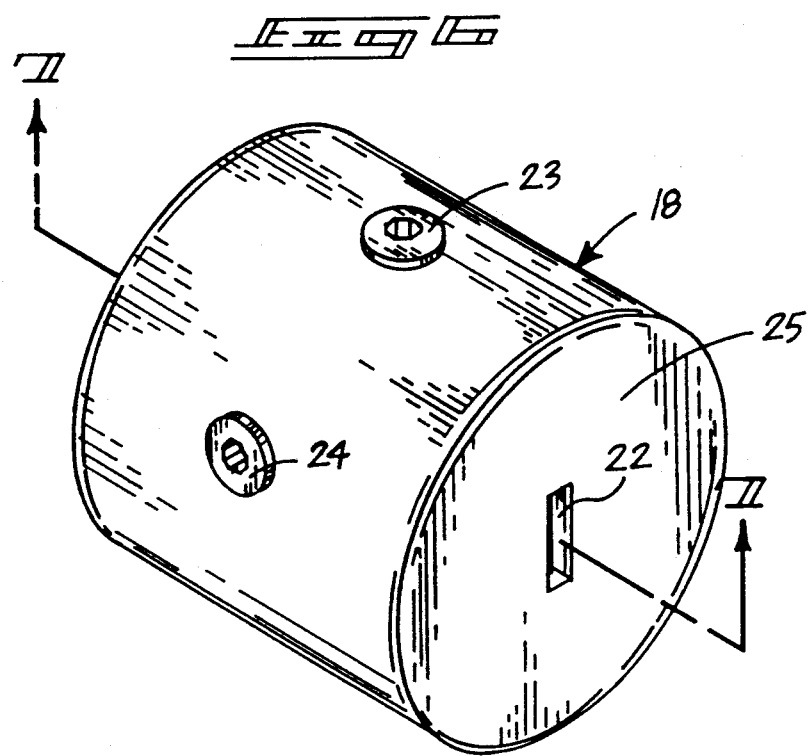

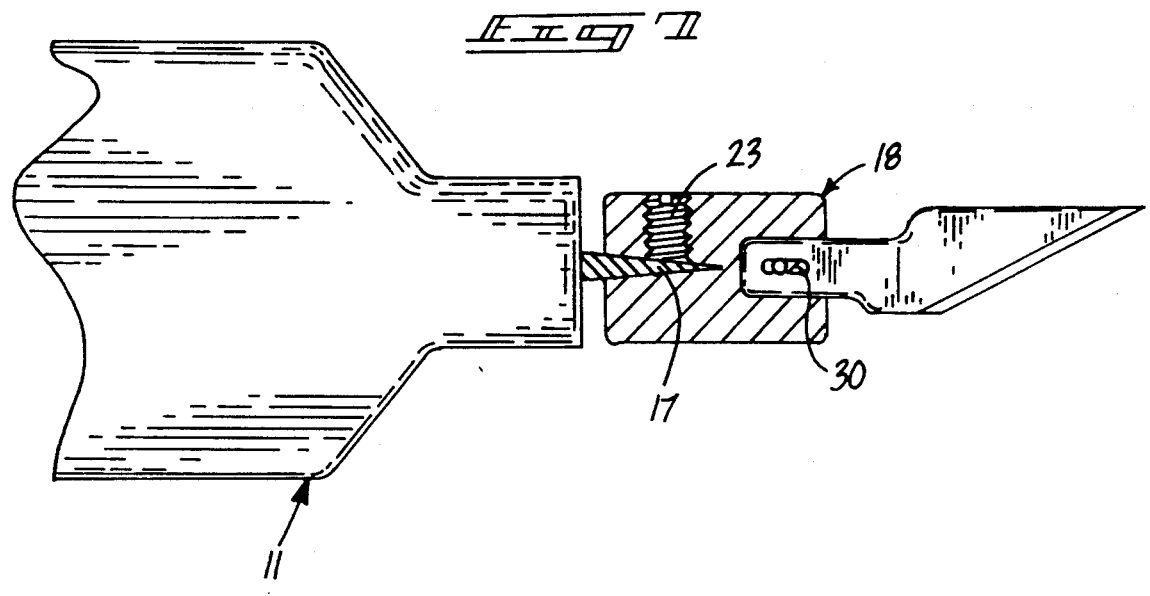
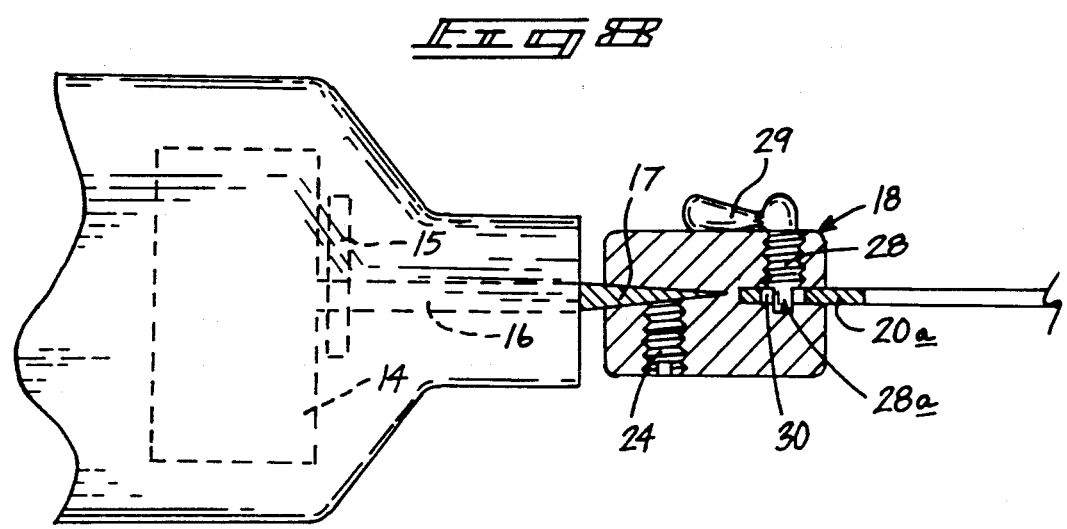

VIBRATORY CARVING TOOL KIT

BACKGROUND OF THE INVENTION

1. Field of the Invention

The field of invention relates to carving apparatus, and more particularly pertains to a new and improved vibratory carving tool kit wherein the same is arranged for directing vibratory energy into a carving tool knife mounted at a forward end of an elongate housing.

2. Description of the Prior Art

Carving apparatus for directing carving pieces is known throughout the prior art. Such prior art is exemplified in Berlant U.S. Pat. No. 3,623,399 wherein an engraving machine is provided mounting an engraver overlying a workpiece, wherein the engraver is mounted within articulated linkage. Young U.S. Pat. No. 3,803,979 and U.S. Pat. No. 3,894,475 are further examples of engraving machines wherein a workpiece is secured and an engraver is manipulatable relative to a surface of the workpiece to effect an engraving procedure.

Further examples of engraving machines are provided in Gorton et al. U.S. Pat. Nos. 2,100,953 and 2,110,873 utilizing linkage structure to impart engraving into surfaces of workpieces.

As such, it may be appreciated that there continues to be a need for a new and improved vibratory carving tool kit as set forth by the instant invention which addresses both the problems of ease of use as well as effectiveness in construction in utilizing vibratory energy to enhance cutting and scoring of various workpieces.

SUMMARY OF THE INVENTION

In view of the foregoing disadvantages inherent in the known types of carving apparatus now present in the prior art, the present invention provides a vibratory carving tool kit wherein the same utilizes vibratory energy to expedite a cutting operation in manually grasped tool. As such, the general purpose of the present invention, which will be described subsequently in greater detail, is to provide a new and improved vibratory carving tool kit which has all the advantages of the prior art carving apparatus and none of the disadvantages.

To attain this, the present invention provides a carving tool member utilizing a vibratory motor to effect vibratory energy to a shaft projection directed longitudinally of a housing, with the shaft projection mounted to a clamp cylinder. The clamp cylinder selectively mounts a neck member therewithin. The clamp cylinder utilizes various clamp screws directed into the clamp cylinder to secure the clamp cylinder to the wedge projection and the knife member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vibratory carving tool kit which has all the advantages of the prior art carving apparatus and none of the disadvantages.

It is another object of the present invention to provide a new and improved vibratory carving tool kit which may be easily and efficiently manufactured and marketed.

It is a further object of the present invention to provide a new and improved vibratory carving tool kit which is of a durable and reliable construction.

An even further object of the present invention is to provide a new and improved vibratory carving tool kit which is susceptible of a low cost of manufacture with regard to both materials and labor, and which accordingly is then susceptible of low prices of sale to the consuming public, thereby making such vibratory carving tool kits economically available to the buying public.

Still yet another object of the present invention is to provide a new and improved vibratory carving tool kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of the clamp cylinder utilized by the instant invention.

FIG. 6 is a further isometric illustration of the clamp cylinder utilized by the instant invention.

FIG. 7 is an orthographic side view, partially in section, of the clamp cylinder in association with the housing organization, taken along the lines 7—7 of FIG. 6 in the direction indicated by the arrows.

FIG. 8 is an orthographic view, taken along the lines 8—8 of FIG. 5 in the direction indicated by the arrows.

DESCRIPTION OF THE PREFERRED EMBODIMENT

Figure 1:
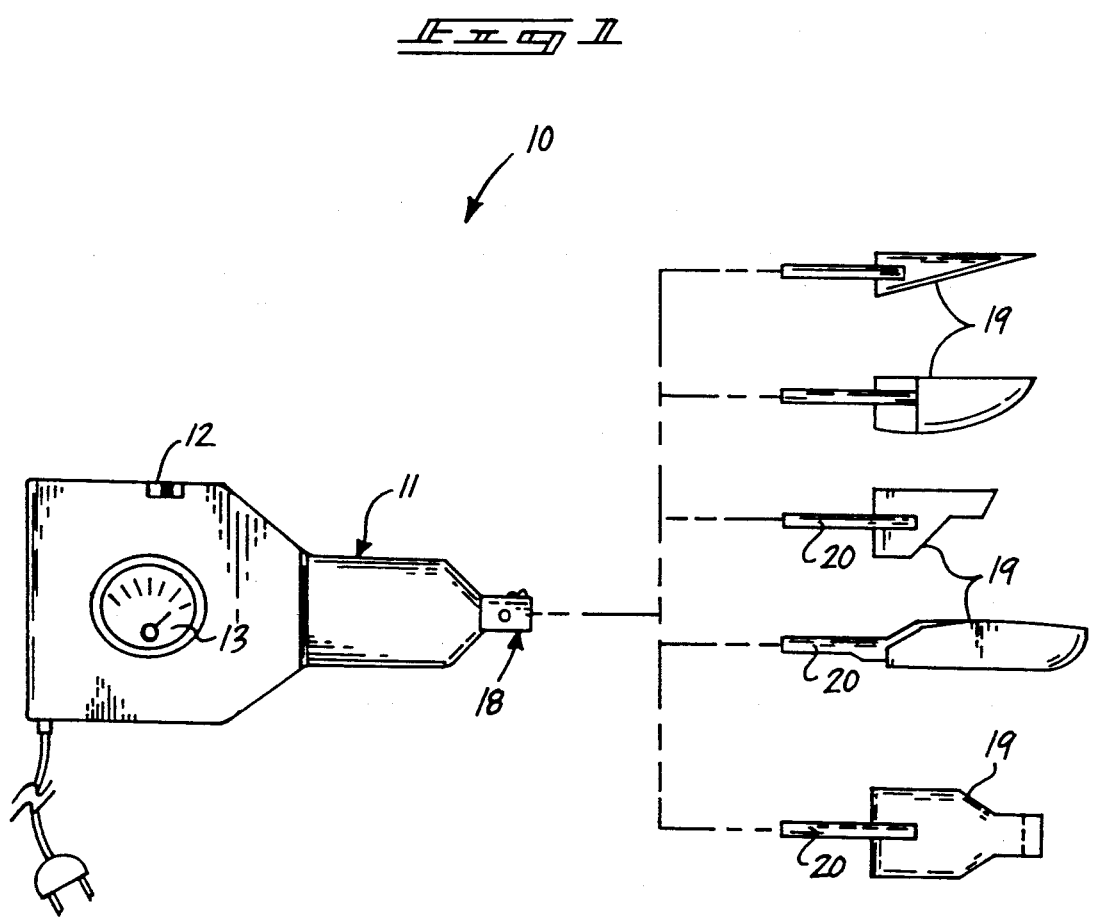
FIG. 1 is an orthographic view of the kit structure of the instant invention.
Figure 2:
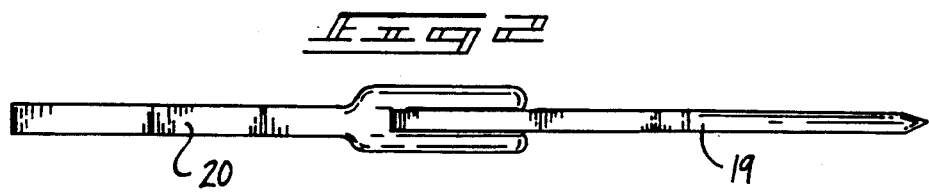
FIG. 2 is an orthographic top view of a typical blade utilized by the instant invention.
Figure 3:
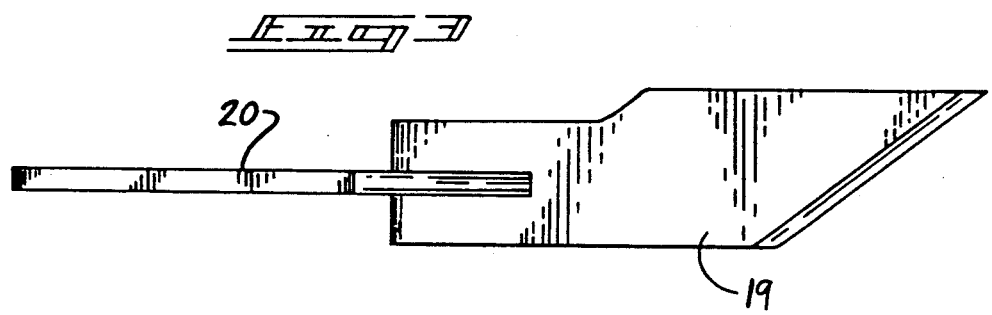
FIG. 3 is an orthographic side view of a typical leg utilized by the instant invention.
Figure 4:
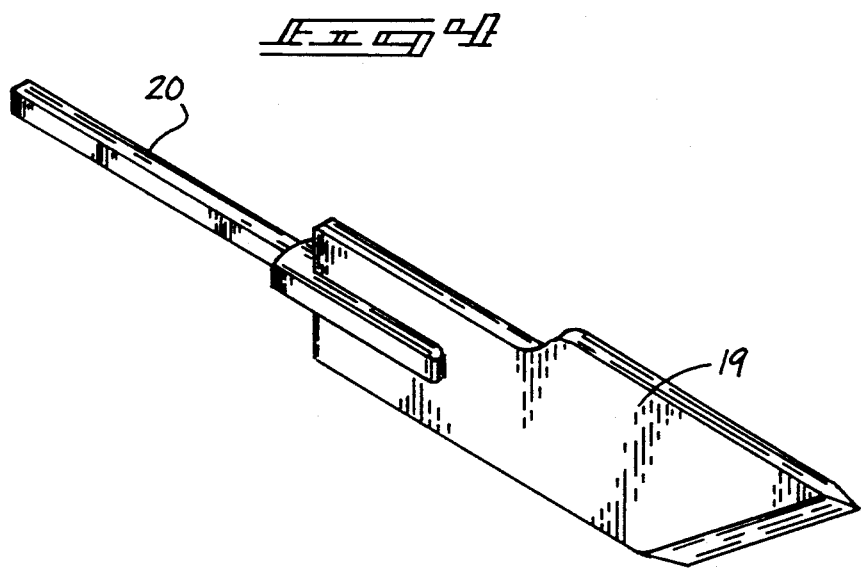
FIG. 4 is an isometric illustration of a typical blade structure utilized by the instant invention.

With reference now to the drawings, and in particular to FIGS. 1 to 8 thereof, a new and improved vibratory carving tool kit embodying the principles and concepts of the present invention and generally designated by the reference numeral 10 will be described.

More specifically, the vibratory carving tool kit 10 of the instant invention essentially comprises a housing 11, with the housing 11 including a switch 12 operative to effect selective actuation of a drive motor 14 (in phantom as depicted in FIG. 8) and operative through a rheostat control 13 to effect selective cycles per second of an eccentric 15 driven through the drive motor 14. Eccentric 15 is mounted to a shaft 16 to impart vibration thereto, wherein the shaft 16 projects coaxially of the forward end of the housing 11 in a wedge-shaped forward projection 17. A clamp cylinder 18 is arranged for clamping to the wedge shaped projection 17 and for securing of a cutter blade shank 20 of an associated array of cutter blades 19. The cutter blades 19 are of different configurations adapted for various wood carving requirements.

The clamp cylinder 18 is defined of a cylindrical configuration, including a forward clamp cylinder wall 26 orthogonally arranged relative to an axis defined by the clamp cylinder 18, and wherein the forward clamp cylinder wall 26 is arranged parallel to and spaced from a rear clamp cylinder wall 25. The rear clamp cylinder wall 25 includes a clamp cylinder wedge-shaped slot 22 directed coaxially therethrough to receive the wedge-shaped projection defined by the forward terminal end of the shaft 16 projecting from the housing 11. The wedge-shaped slot 22 includes a respective first and second clamp screw 23 and 24 respectively radially directed into the cylindrical wall of the clamp cylinder 18 and spaced ninety degrees relative to one another for securement of the wedge-shaped projection 17. The forward clamp cylinder wall 26 includes a clamp cylinder rectangular bore 27 coaxially aligned with the clamp cylinder 18 to receive a cutter blade shank 20 therewithin. A modified cutter blade shank 20a includes a shank slot 30 to receive a shank clamping screw 28 that includes a clamping screw projecting leg 28a coaxially aligned with the clamping screw 28 defined by a first diameter less than the second diameter defined by the clamping screw 28, wherein the projecting leg 28a is received within the shank slot 30. The shank clamp screw 28 includes a lever member 29 orthogonally mounted to an upper terminal end of the clamping screw 28 to permit ease of manual rotation of the clamping screw 28 in securement of the shank of an associated cutter blade 19 within the clamp cylinder rectangular bore 27.

In this manner, ease of selective mounting of an associated cutter blade 19 to the vibratory housing 11 is provided for enhanced carving of a workpiece.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vibratory carving tool kit, comprising in combination, an elongate longitudinally aligned housing, the housing including a drive motor mounted therewithin, the drive motor operative through a switch, and the drive motor including an eccentric in operative association with the drive motor, the eccentric mounted about a shaft to effect vibration to the shaft, and the shaft extending through a forward end of the housing and terminating in a wedge-shaped projection, and a clamp cylinder securable to the wedge-shaped projection, and a plurality of cutter blades, each of the cutter blades including a cutter blade shank, and the shank receivable within the clamp member coaxially aligned with the wedge-shaped projection.

2. An apparatus as set forth in claim 1 wherein the clamp cylinder includes a cylindrical side wall and a planar forward cylindrical wall spaced from and parallel a planar rear cylinder wall, the planar forward and rear cylinder walls are orthogonally aligned relative to an axis defined by the clamp cylinder, and the forward cylinder wall including a wedge-shaped slot orthogonally directed into the clamp cylinder through the rear cylinder wall, wherein the wedge-shaped slot is of a complementary configuration to the wedge-shaped projection, and a first and second clamp screw radially directed through the cylindrical wall and the first and second clamp screws intersecting the wedge-shaped slot, and the first and second clamp screws spaced apart ninety degrees relative to one another.

3. An apparatus as set forth in claim 2 wherein the forward cylinder wall includes a rectangular bore coaxially aligned with the clamp cylinder orthogonally directed through the forward cylinder wall, and a shank clamping screw radially directed through the cylindrical wall intersecting the rectangular bore, and each cutter blade shank including a shank slot, and the shank clamping screw including a projecting leg coaxially and forwardly mounted relative to the clamping screw, wherein the projecting leg is defined by a second diameter and the shank clamping screw defined by a first diameter, wherein the second diameter is less than the first diameter, and the projecting leg is receivable within the shank slot to lock the leg shank within the rectangular bore.

* * * * *